United States Patent
Halbert et al.

(10) Patent No.: US 7,249,232 B2
(45) Date of Patent: Jul. 24, 2007

(54) BUFFERING AND INTERLEAVING DATA TRANSFER BETWEEN A CHIPSET AND MEMORY MODULES

(75) Inventors: John B. Halbert, Beaverton, OR (US); Jim M. Dodd, Shingle Springs, CA (US); Chung Lam, Redwood City, CA (US); Randy M. Bonella, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 694 days.

(21) Appl. No.: 10/777,921

(22) Filed: Feb. 11, 2004

(65) Prior Publication Data

US 2004/0188704 A1  Sep. 30, 2004

Related U.S. Application Data

(63) Continuation of application No. 09/675,304, filed on Sep. 29, 2000, now Pat. No. 6,697,888.

(51) Int. Cl.
*G06F 13/00* (2006.01)
*G06F 3/00* (2006.01)
*G06F 5/06* (2006.01)

(52) U.S. Cl. .................. 711/157; 710/52; 710/310; 711/105

(58) Field of Classification Search ............ 711/157
See application file for complete search history.

(56) References Cited

U.S. PATENT DOCUMENTS

| | | | |
|---|---|---|---|
| 5,572,691 A | 11/1996 | Koudmani | |
| 5,757,712 A | 5/1998 | Nagel et al. | |
| 5,768,624 A | 6/1998 | Ghosh | |
| 5,828,892 A | 10/1998 | Mizuta | |
| 5,926,838 A | 7/1999 | Jeddeloh | |
| 5,953,215 A | 9/1999 | Karabatsos | |
| 6,345,321 B1 | 2/2002 | Litaize et al. | |
| 6,493,776 B1 | 12/2002 | Courtright et al. | |
| 6,502,161 B1 | 12/2002 | Perego et al. | |
| 6,553,450 B1 | 4/2003 | Dodd et al. | |
| 2001/0052057 A1 | 12/2001 | Lai et al. | |

FOREIGN PATENT DOCUMENTS

| | | |
|---|---|---|
| EP | 0691617 | 1/1996 |
| JP | 2000231784 | 8/2000 |
| WO | WO 99/30240 | 6/1999 |

OTHER PUBLICATIONS

Pohm et al., "The Cost and Performance Tradeoffs of Buffered Memories", Proceedings of the IEEE, Aug. 1975, IEEE, vol. 63, Is. 8, pp. 1129-1135.*
Cover page and search report of International Publication No. WO 02/023355, 5 pages.
Cover page and search report of International Publication No. WO 02/023355 (revised version), 5 pages.

* cited by examiner

*Primary Examiner*—Reginald Bragdon
*Assistant Examiner*—Tyler Willhite
(74) *Attorney, Agent, or Firm*—Philip A. Pedigo

(57) ABSTRACT

Providing electrical isolation between the chipset and the memory data is disclosed. The disclosure includes providing at least one buffer in a memory interface between a chipset and memory modules. Each memory module includes a plurality of memory ranks. The buffers allow the memory interface to be split into first and second sub-interfaces. The first sub-interface is between the chipset and the buffers. The second sub-interface is between the buffers and the memory modules. The method also includes interleaving output of the buffers, and configuring the buffers to properly latch the data being transferred between the chipset and the memory modules. The first and second sub-interfaces operate independently but in synchronization with each other.

26 Claims, 6 Drawing Sheets

BUFFERING AND INTERLEAVING DATA TRANSFER BETWEEN A CHIPSET AND MEMORY MODULES

This application is a continuation of U.S. Pat. No. 6,697,888, entitled "BUFFERING AND INTERLEAVING DATA TRANSFER BETWEEN A CHIPSET AND MEMORY MODULES," which issued from U.S. application Ser. No. 09/675,304, filed Sep. 29, 2000, the contents of which are incorporated herein by reference.

BACKGROUND

The present disclosure relates to providing data buffers in an interface between a chipset and multiple ranks of memory modules.

Computer systems often contain one or more integrated circuit ("IC") chips, often called a chipset, that are coupled to memory modules via a memory interface. The memory interface provides communication between the IC chipset (e.g. the CPU) and the memory modules. The memory interface may contain address bus lines, command signal lines, and data bus lines. Increasing demand for higher computer performance and capacity has resulted in a demand for a larger and faster memory. However, as the operating speed and the number of memory modules connected to the chipset increase, the resulting increased capacitive loading may place a substantial limit on the amount and speed of memory.

Prior art designs, such as a registered dual in-line memory module (DIMM), have addressed the above-described difficulties by providing an address/command buffer in the address bus lines and the command signal lines to relieve the capacitive loading effects. Karabatsos (U.S. Pat. No. 5,953,215) describes a loading relief design for the data bus lines by providing FET switches in the interface between the chipset and the memory modules.

In the prior art design 100 of FIG. 1, the interface 108 between the chipset 102 and the memory modules 104 is unbuffered. In some embodiments, the memory modules 104 may be individually mounted on memory boards 106 as shown. In other embodiments, the memory modules 104 may be soldered directly onto the same motherboard as the chipset 102.

In the prior art design 100, the chipset 102 is often configured to receive two supply voltages, about 1.0 volt (low) and 1.5 volts (high). The high voltage is necessary on the chipset side to provide compatible driving voltage on the memory interface 108. Further, the pin count on the chipset 102 may be designed to be 2x in order to provide a particular memory access rate or frequency, such as ω.

BRIEF DESCRIPTION OF THE DRAWINGS

Different aspects of the disclosure will be described in reference to the accompanying drawings wherein.

DETAILED DESCRIPTION

The inventors of the present disclosure recognized that none of the prior art designs offer isolation of supply voltages and interfaces coupled to the chipset and the memory modules. Buffering the address and command lines relieves the capacitive loading effects, while providing the FET switches in the data lines offers a loading relief on those lines. However, neither design provides electrical isolation between the chipset and the memory data.

The differences in fabrication process between the chipset and the memory modules place additional burdens on the computer system design. For example, oxides on a memory chip are designed to be thick to provide capacitors with good retention characteristic. Thick oxides also keep leakage current low. However, a higher voltage (on the order of about 1.2 to 1.8 volts) must be supplied to build conducting channels beneath the oxides. The chipset (Central Processing Unit (CPU) or application specific integrated circuit (ASIC) design) fabrication process, on the other hand, promotes thinner oxides providing faster transistors. Therefore, the chipset may be operated at a lower voltage, typically less than 1.0 volt.

The present disclosure describes methods and systems for providing electrical isolation between the chipset and the memory data. The method includes providing at least one buffer in a memory interface between a chipset and memory modules. Each memory module includes a plurality of memory ranks. The buffer allows the memory interface to be split into first and second sub-interfaces. The first sub-interface is between the chipset and the buffer. The second sub-interface is between the buffer and the memory modules. The method also includes interleaving the outputs of the memory ranks in the memory modules, and configuring the buffers to properly latch data being transferred between the chipset and the memory modules. The first and second sub-interfaces operate independently but in synchronization with each other.

Buffering provides isolation of voltages and interfaces coupled to each of the chipset and the memory modules. The isolation of voltages allows the chipset to be operated with a low operating voltage, which substantially precludes the need for the chipset to have a higher voltage common with a memory supply voltage. The memory module is then allowed to operate at voltages appropriate for its own operational purpose. The voltages may be independent of the operating voltage at the connecting system (chipset).

Figure 1:
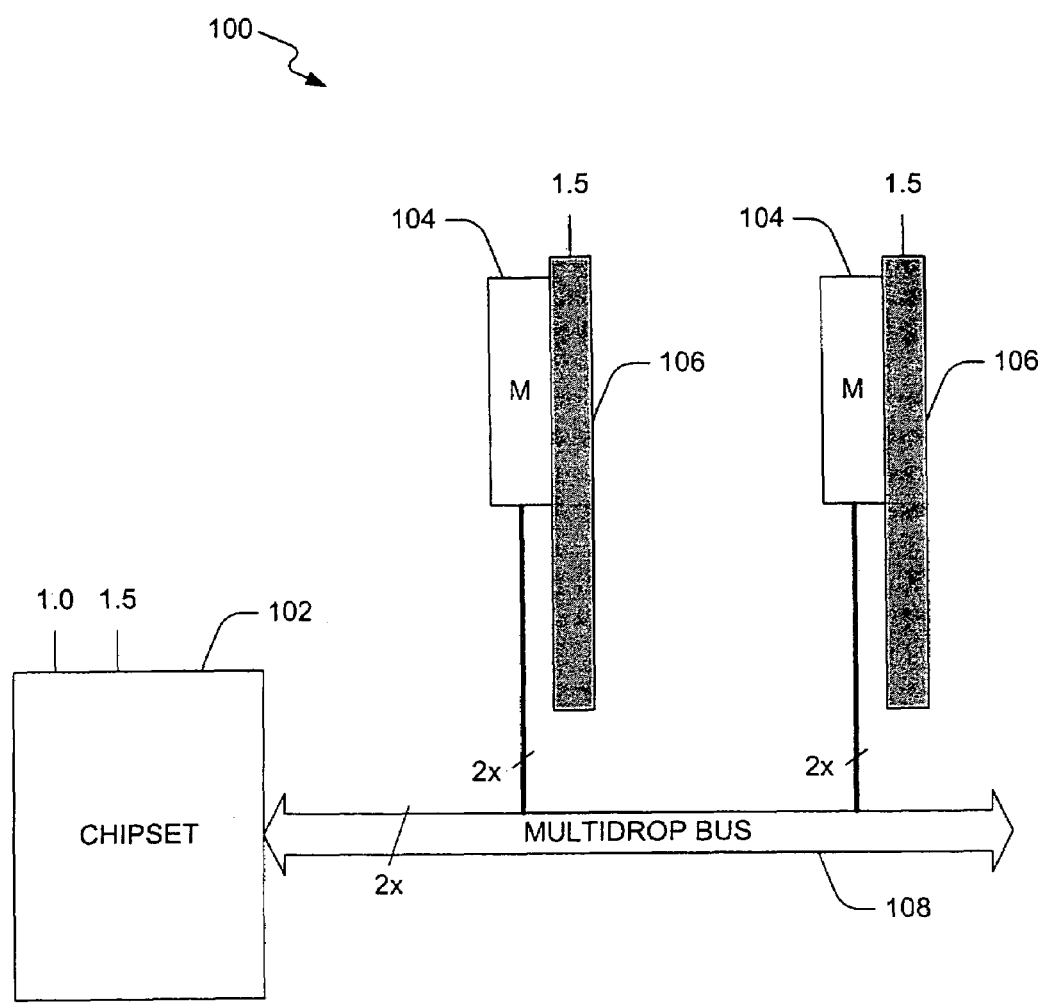
FIG. 1 shows a prior art design of an interface between a chipset and memory modules.

The isolation of the interfaces allows the inherently faster chipset interface to run at higher multiples of the memory interface rate. For example, the chipset to data buffer interface may run at twice the rate of the buffer to memory interface. This may allow the chipset to operate at twice the rate and access the same amount of data with half the number of data bus lines or pins. This provides computer system designers with a flexibility of utilizing a wider range of memory types and interfaces for a particular computer system. By providing a data buffer on the memory module itself, the memory interface may be simplified by providing a short, fixed length stubs from the buffer to the memory module. In some configurations, the data buffer may be provided on the same motherboard as the chipset. An advantage provided by the electrical isolation that leads to the reduction in the pin count is illustrated in the design comparison between FIGS. 1 and 2.

Further, by providing more than one buffer on a memory board, the outputs of memory ranks from one memory module may be interleaved with that of another memory module on the same memory board. This allows the flexibility of designing a memory board with different size and configuration of the memory chips.

Figure 2:
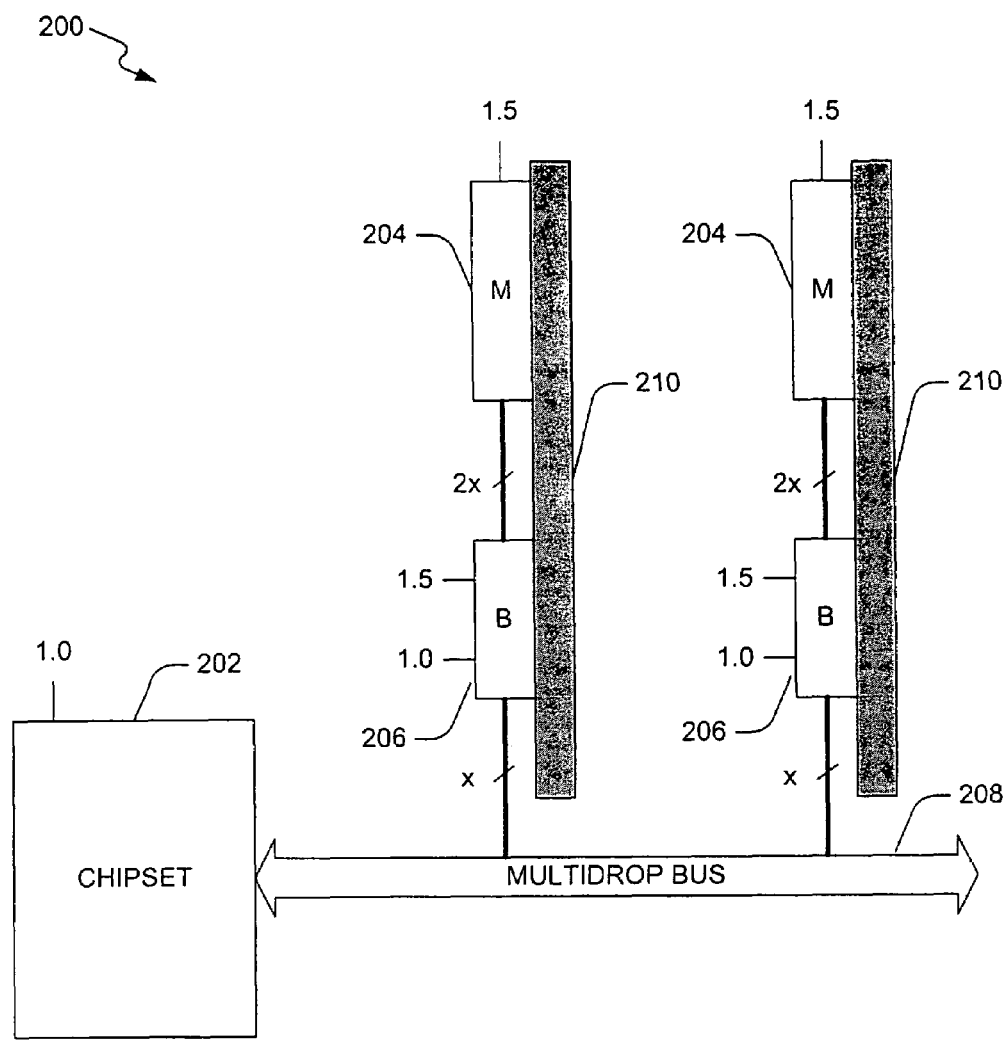
FIG. 2 illustrates an embodiment of an interface having a plurality of data buffers disposed between the chipset and the memory modules.

In the illustrated embodiment 200 of FIG. 2, a plurality of data buffers 206 is disposed in the memory interface between the chipset 202 and the memory modules 204 to provide electrical isolation. For the illustrated embodiment, a multidrop bus 208 provides the interface between the chipset 202 and the data buffers 206. The interface between the chipset 202 and the data buffers 206 may be run at twice the data access rate or frequency (2ω) as before, but with half the pin count (x) of the prior art design. The interface between the data buffers 206 and the memory modules 204 still has 2x number of pins to provide the same data access rate as before. In practice, x is often selected to be 16 or 32. Moreover, the chipset 202 is configured to operate with only the low voltage (1.0 volt) as shown. The chipset 202 may be operated with less than 1.0 volt. The memory modules 204 are operated with only the high voltage (1.5 volts). Typically, the memory modules 204 may be operated with voltages between 1.2 and 1.8 volts.

In the illustrated embodiment of FIG. 2, the data buffer 206 is provided on the same memory board 210 as the memory module 204. However, the data buffer 206 may be provided on the motherboard containing the chipset 202.

Figure 3:
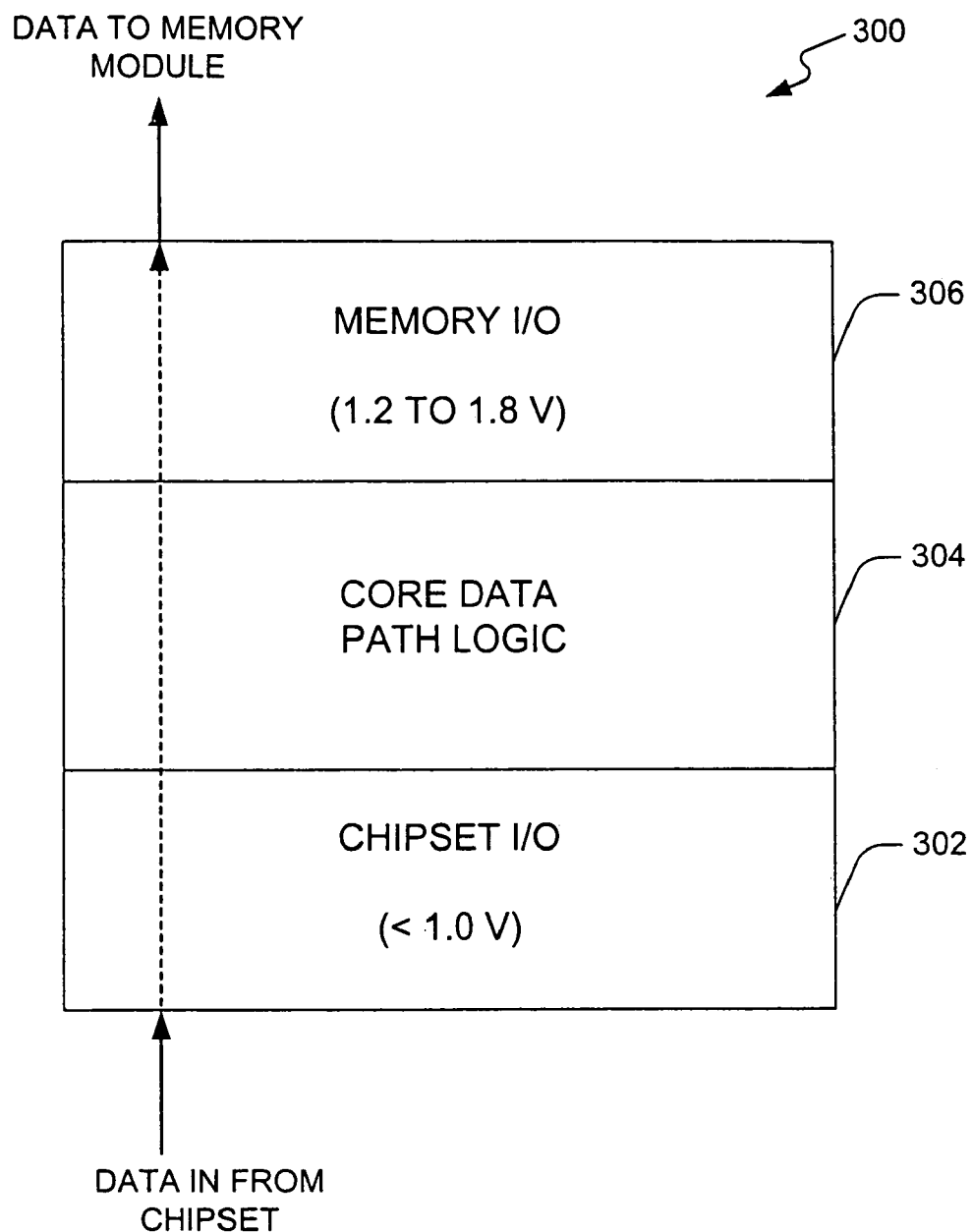
FIG. 3 shows a layout configuration of a data buffer.

FIG. 3 shows a layout configuration of a data buffer 300, similar to the data buffer 206 of FIG. 2, in accordance with an embodiment of the present disclosure. The data buffer 300 includes three portions 302, 304, 306. The first portion 302 is a chipset input/output (I/O) port configured to send and receive data to and from the chipset through the multidrop bus 208. The first portion 302 operates at the same voltage (<1.0 volts) as the chipset. This allows compatibility of interface between the chipset and the data buffer 300. The second portion 304 is a core data path logic portion allowing for buffering of data between the chipset and the memory module. The third portion 306 is a memory I/O port configured to send and receive data to and from the memory module. The third portion operates at the same nominal voltage as the memory module (between 1.2 and 1.8 volts).

Figure 4:
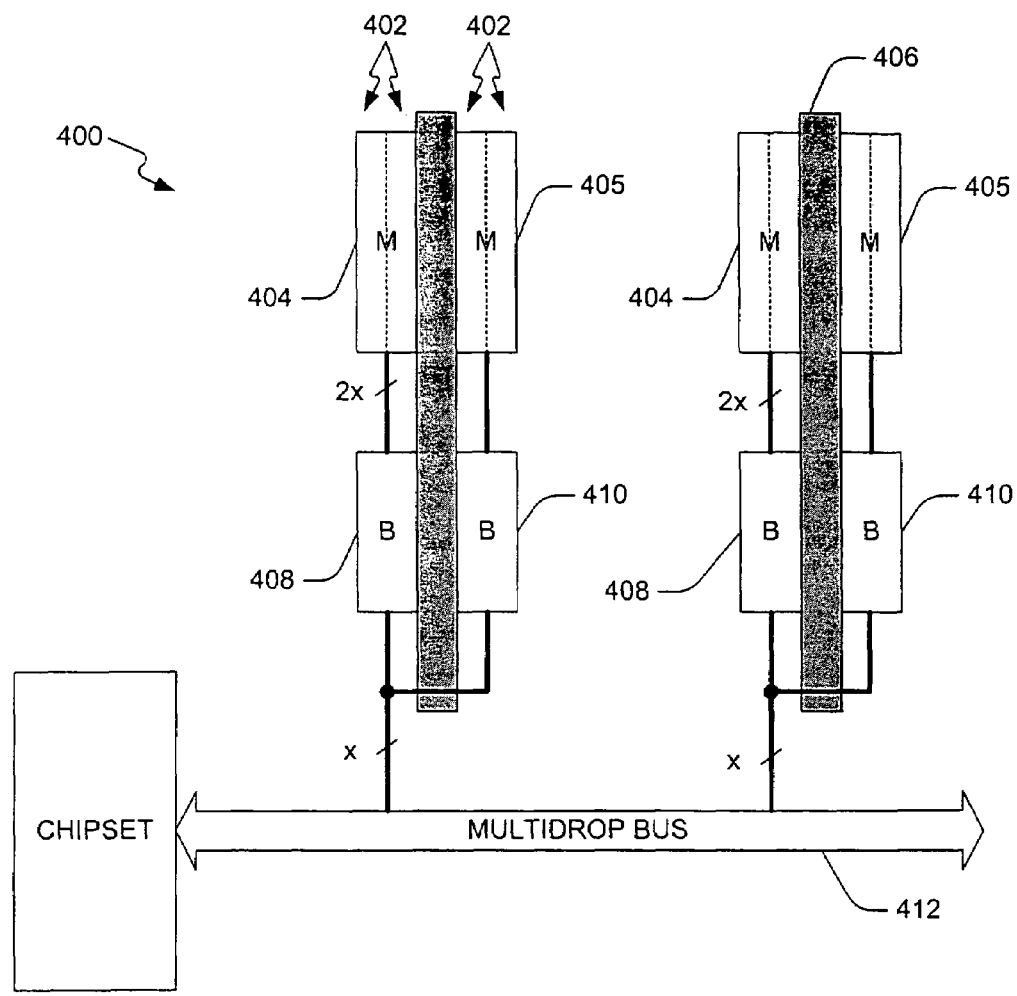
FIG. 4 shows an alternative embodiment of the interface where each memory board contains multiple ranks of memory modules.

FIG. 4 shows an alternative embodiment 400 of FIG. 2, where each memory module 404, 405 contains two memory ranks 402. However, each memory module 404, 405 may include more than two memory ranks 402. As before, the pin count on the interface between the chipset and the buffer may be configured to be x while the pin count on the interface between the buffer and the memory module 404, 405 is 2x.

Each buffer 408, 410 receives the outputs from the multiple memory ranks 402 within a memory module 404, 405. Thus, outputs from one memory module are routed to a respective buffer 408, 410. The data outputs from the buffers 408, 410 may then be interleaved before being placed on a multidrop bus. In the illustrated configuration, the buffer data outputs are interleaved in a wired-OR configuration. The outputs may be interleaved in different configurations such as in multiplexing.

The data outputs from the two buffers 408, 410 are then sequentially placed onto the multidrop bus 412. Control logic in the chipset may coordinate the transfer of data from the buffers 408, 410 in an interleaved mode. Thus in this embodiment, the two ranks 402 of the memory modules 404, 405 are bit-wise configured to double the bit numbers required on the data buffer to the chipset interface.

Figure 5:
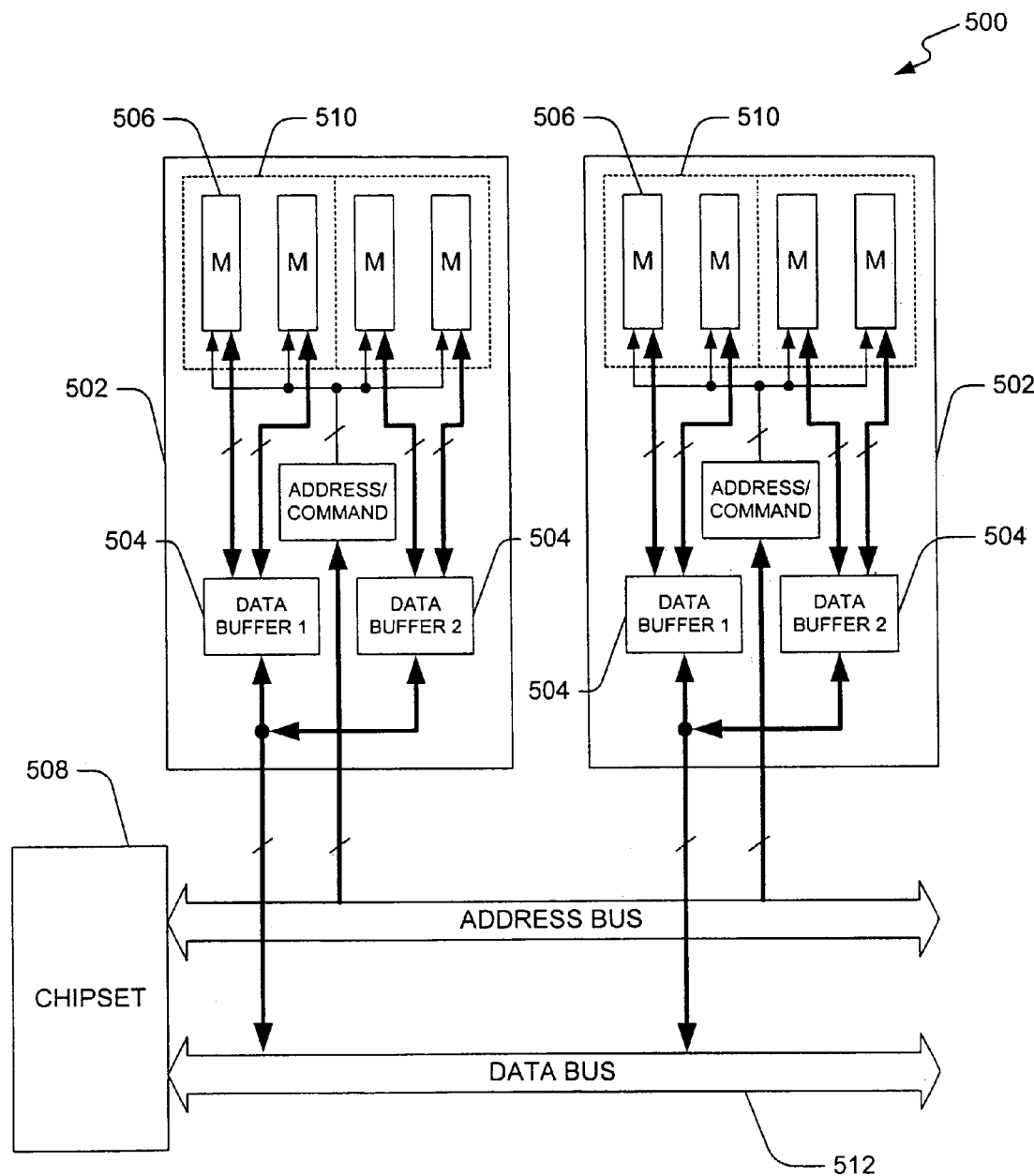
FIG. 5 is a front view of the interface showing the details of memory boards having multiple ranks of memory modules.

A front view of the memory interface showing the details of the memory boards 502 is shown in FIG. 5. The figure also highlights the connections to the data bus 512 and the data buffers 504. The front view of the memory interface shows the isolation of the memory modules 510 from the chipset 508. In the illustrated embodiment 500, the reduction in the pin count can be ascertained. For example, there are two lines coming from each memory module 510 to connect to each data buffer 504. However, there is only one line between the buffer 504 and the data bus 512. Thus, in this case, the pin count may be reduced in half. Each solid line, between the memory modules 510 and the data buffer 504 and between the data buffer 504 and the data bus 512, may be implemented with more than one electrically connecting line.

The embodiment 500 of FIG. 5 further illustrates the possibility of having multiple data buffers 504 and memory modules 510, where each memory module 510 may have multiple memory ranks 506. In this embodiment 500, a data buffer 504 is paired with one memory module 510 having multiple memory ranks 506. However, a data buffer 504 may be coupled to more than one memory module 510.

This embodiment 500 also illustrates interleaving of the data buffer outputs to the data bus 512. For example, the output of the data buffer #1 may be coupled to the output of the data buffer #2 in a wired-OR configuration. As stated above, control logic may coordinate the transfer of data from the buffers 504 to the chipset 508 in an interleaved mode.

The memory modules in this and other embodiments may be of any memory types. However, in particular, the memory modules may be dynamic random access memories (DRAM), double data rate (DDR) DRAM, or quad data rate (QDR) DRAM. The quad data rate DRAM may be achieved by providing a pin count of 4x in the second sub-interface between the buffer and the memory module, and operating the first sub-interface between the buffer and the chipset at 4 times the rate of the second sub-interface (see FIG. 2).

Figure 6:
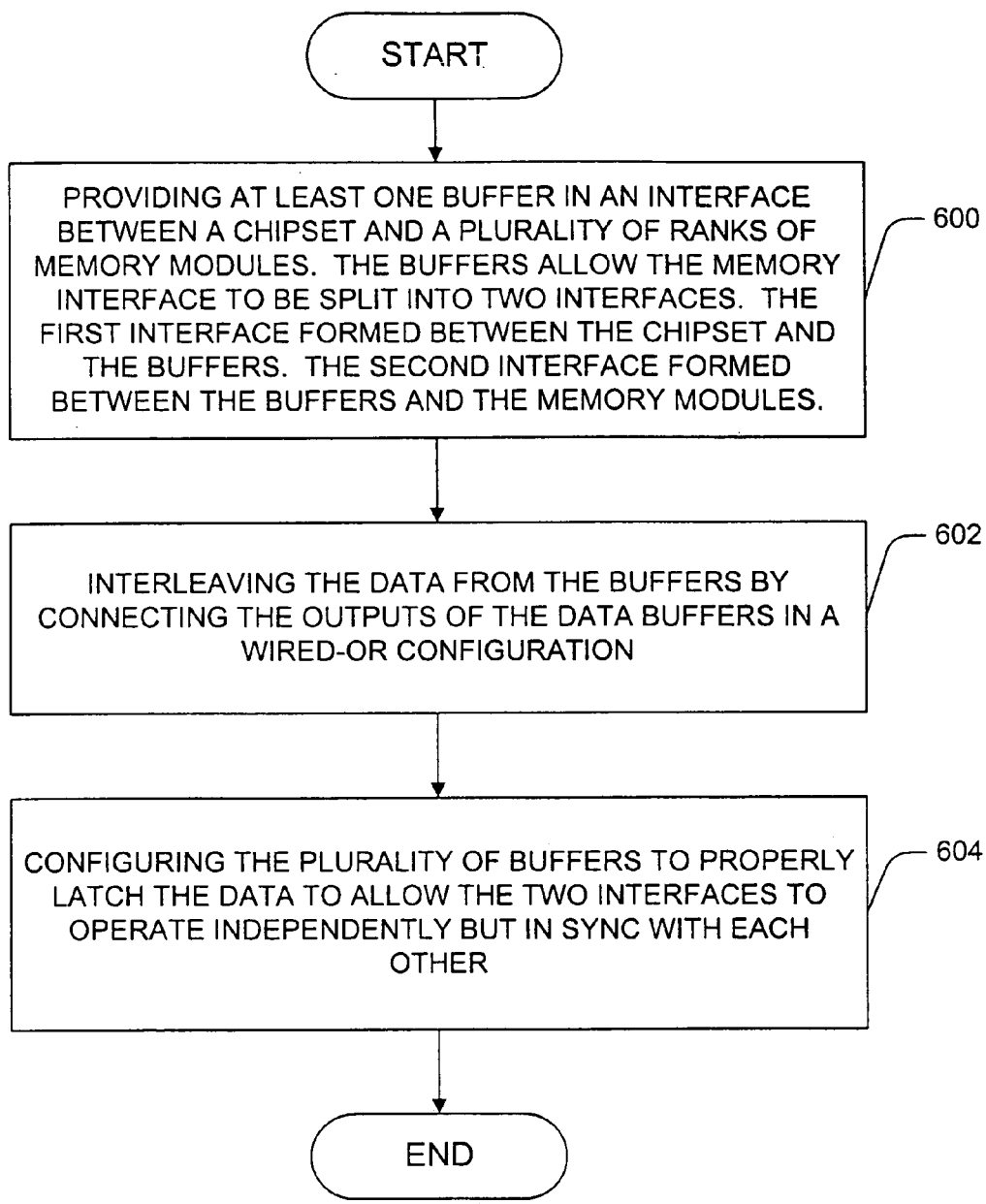
FIG. 6 shows a method for buffering the data passed between the chipset and multiple ranks of memory modules.

FIG. 6 shows buffering the data passed between the chipset and a plurality of memory ranks in the memory modules. The buffers provide isolation of voltages and interfaces. The method includes providing at least one buffer in an interface between a chipset and the multiple ranks of memory modules at 600. The buffers allow the memory interface to be split into two interfaces. The first interface is between the chipset and the buffers. The second interface is between the buffers and the multiple ranks of memory modules. The buffers provide isolation between the memory modules and the chipset. Outputs of the buffers are then provided to the data bus by interleaving the outputs in a wired-OR configuration at 602. The buffer is then configured to properly latch the data being transferred between the chipset and the plurality of memory modules at 604. This allows the first and second interfaces to operate independently but synchronized with each other.

While specific embodiments of the invention have been illustrated and described, other embodiments and variations are possible. For example, although an illustrated embodiment shows only two memory ranks in a memory module, each rank providing one data line to a data buffer, the memory module may be configured to with more than two memory ranks. Furthermore, each memory rank may be implemented with more than one data line to carry the data between the memory module and the buffer.

All these are intended to be encompassed by the following claims.

What is claimed is:

1. An apparatus, comprising:
    a memory buffer including
        a memory module sub-interface to communicate with one or more memory modules,
        a chipset sub-interface to communicate with a chipset, the chipset sub-interface being electrically isolated from the memory module sub-interface,
        a data latch to latch data being transferred between the chipset sub-interface and the memory module sub-interface such that the chipset sub-interface, and the memory module sub-interface operate independently but in synchronization with each other, and
        control logic to coordinate an output of data from the memory buffer in an interleaved mode with data from another memory buffer.

2. The apparatus of claim 1, wherein the chipset sub-interface includes outputs to be interleaved.

3. The apparatus of claim 1, wherein the control logic is to coordinate an output of data in a wired-OR interleaved mode.

4. The apparatus of claim 1, wherein the control logic is to coordinate the output of the data interleaved with data from a single other memory buffer.

5. The apparatus of claim 1, wherein the memory buffer further comprises a voltage supply line to receive a supply voltage that is independent of an operating voltage of the chipset.

6. The apparatus of claim 1, wherein the memory buffer further comprises:
    a first voltage supply line to receive a first supply voltage that is compatible with an operating voltage of the chipset; and
    a second voltage supply line to receive a second supply voltage that is compatible with an operating voltage of the memory modules.

7. The apparatus of claim 1, wherein:
    the memory module sub-interface includes a first number of data lines to communicate with the memory modules; and
    the chipset sub-interface includes a second number of data lines to communicate with the chipset, the second number being different than the first number.

8. The apparatus of claim 7, wherein the first number is twice the second number.

9. The apparatus of claim 1, wherein the memory module sub-interface comprises fixed length stub data lines to communicate with the memory modules.

10. The apparatus of claim 1, wherein:
    the memory module sub-interface is to operate at a first voltage; and
    the chipset sub-interface is to operate at a second voltage, the second voltage being different than the first voltage.

11. The apparatus of claim 10, wherein the first voltage is between 1.2 and 1.8 volts.

12. The apparatus of claim 10, wherein the second voltage is less than 1.0 volt.

13. The apparatus of claim 1, wherein:
    the memory module sub-interface is to operate at a first frequency; and
    the chipset sub-interface is to operate at a second frequency, the second frequency being different than the first frequency.

14. The apparatus of claim 13, wherein the first frequency is greater than the second frequency.

15. The apparatus of claim 1, wherein the memory module sub-interface comprises a dynamic random access memory (DRAM) sub-interface to communicate with a DRAM module.

16. The apparatus of claim 1, wherein the memory module sub-interface comprises a double data rate (DDR) DRAM sub-interface to communicate with a DDR DRAM module.

17. The apparatus of claim 1, wherein the memory module sub-interface comprises a quad data rate (QDR) DRAM sub-interface to communicate with a QDR DRAM module.

18. The apparatus of claim 1, further comprising:
    a second memory buffer including
        second memory module sub-interface to communicate with one or more memory modules, and
        a second chipset sub-interface to communicate with the chipset, the second chipset sub-interface being electrically isolated from the second memory module sub-interface, the second chipset sub-interface including outputs to output data in an interleaved mode with data from the memory buffer.

19. An apparatus, comprising:
    a memory buffer including
        a memory module sub-interface to communicate with a memory module,
        a chipset sub-interface to communicate with a chipset, the chipset sub-interface being electrically isolated from the memory module sub-interface and including outputs to output data in an interleaved mode with data from another memory buffer, and
        a data latch to latch data being transferred between the chipset sub-interface and the memory module sub-interface such that the chipset sub-interface and memory module sub-interface operate independently but in synchronization with each other.

20. The apparatus of claim 19, wherein the chipset sub-interface comprises outputs to be interleaved in a wired-OR configuration.

21. An apparatus comprising:
    a buffer to be disposed in an interface between a chipset and one or more memory modules, the buffer including
        a first sub-interface with one of the chipset and the memory modules,
        a second sub-interface with the other of the chipset and the memory modules, the second sub-interface operated at a different voltage level and at a lower frequency than the first sub-interface, and
        control logic to coordinate an output of data from the buffer in an interleaved mode with data from another buffer.

22. The apparatus of claim 21, further comprising:
    a second buffer to be disposed in the interface between the chipset and one or more memory modules, the second buffer including a second set of data outputs, the second set of data outputs being interleaved with outputs from one of the first sub-interface and the second sub-interface to form the multiple interleaved interface outputs.

23. The apparatus of claim 21, wherein:
    the first sub-interface comprises a sub-interface with the chipset; and
    the multiple interleaved buffer outputs are to output data over the first sub-interface to the chipset.

24. The apparatus of claim 21, wherein:
    an operating voltage level of said first sub-interface is less than 1.0 volt; and an operating voltage level of said second sub-interface is between 1.2 and 1.8 volts.

25. The apparatus of claim 21, wherein the first sub-interface is operated at twice the frequency of the second sub-interface.

26. The apparatus of claim 21, wherein a number of data lines in said first sub-interface is half that of a number of data lines in said second sub-interface.

* * * * *